Sept. 30, 1958  E. R. WIGAN ET AL  2,854,643
ATTENUATORS
Filed Aug. 13, 1954  3 Sheets-Sheet 1
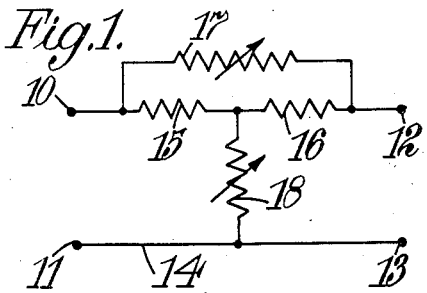
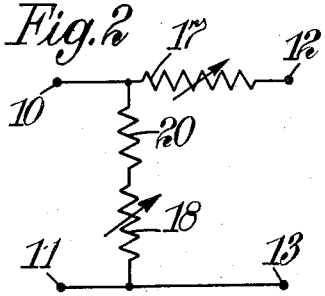
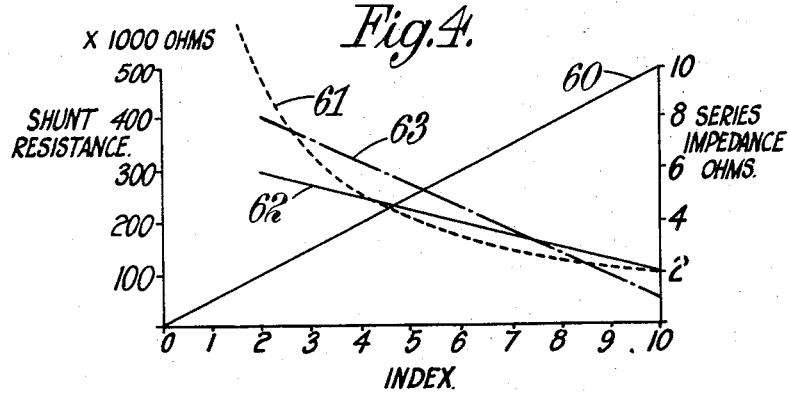
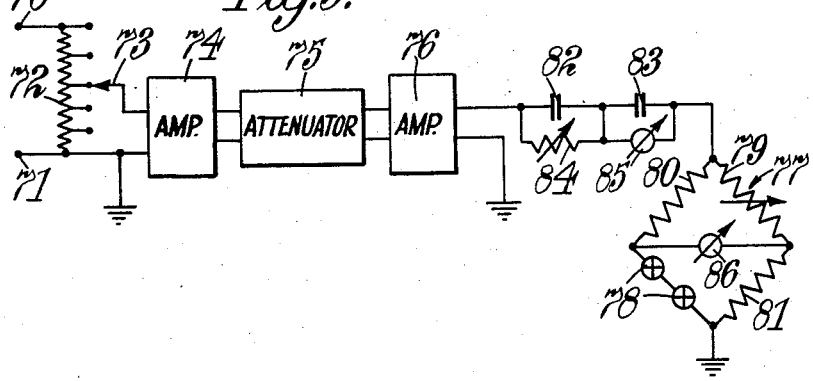
INVENTORS
Edmund R Wigan
Charles G. Mayo
By Watson, Cole, Grindle & Watson
ATTORNEYS Sept. 30, 1958 E. R. WIGAN ET AL 2,854,643
ATTENUATORS
Filed Aug. 13, 1954 3 Sheets-Sheet 2
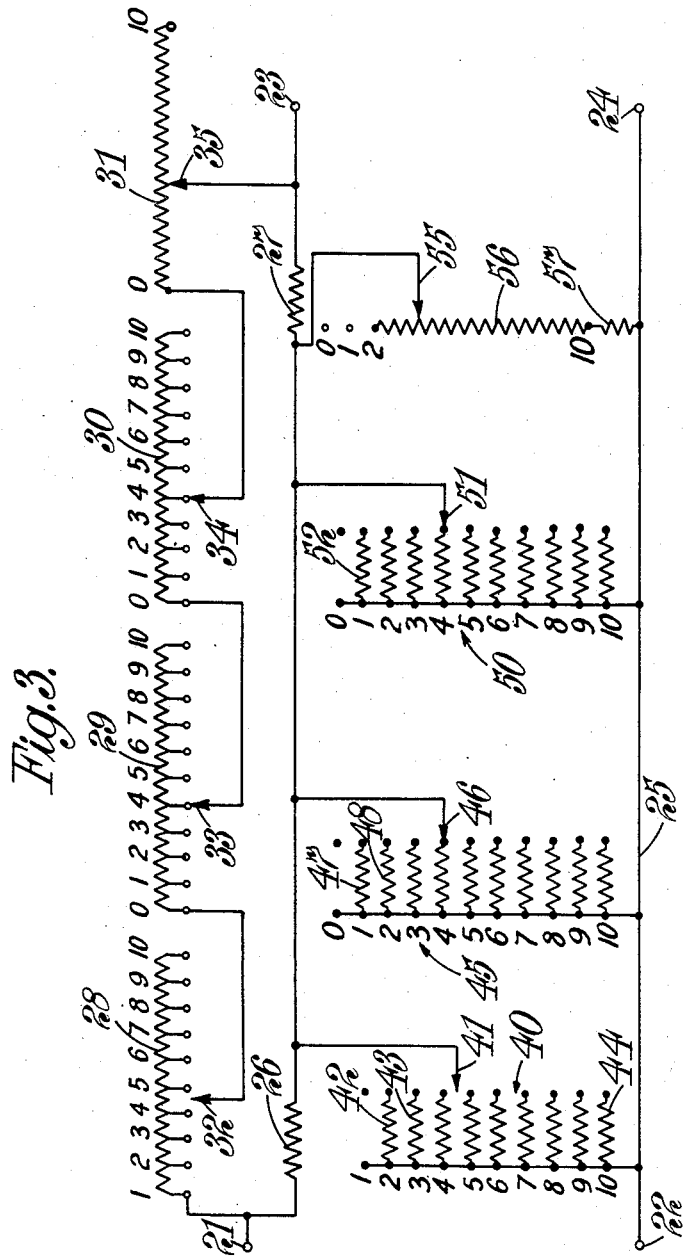
INVENTORS
Edmund R. Wigan
Charles G. Mayo
By Watson, Cole, Grindle & Watson
ATTORNEYS Sept. 30, 1958     E. R. WIGAN ET AL     2,854,643
ATTENUATORS
Filed Aug. 13, 1954     3 Sheets-Sheet 3
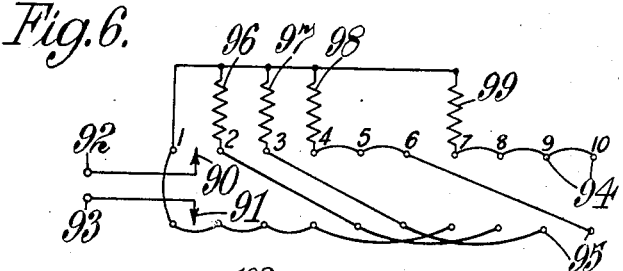
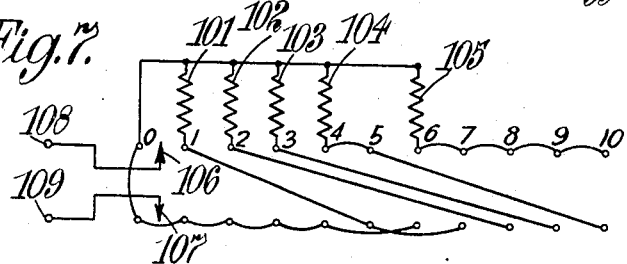
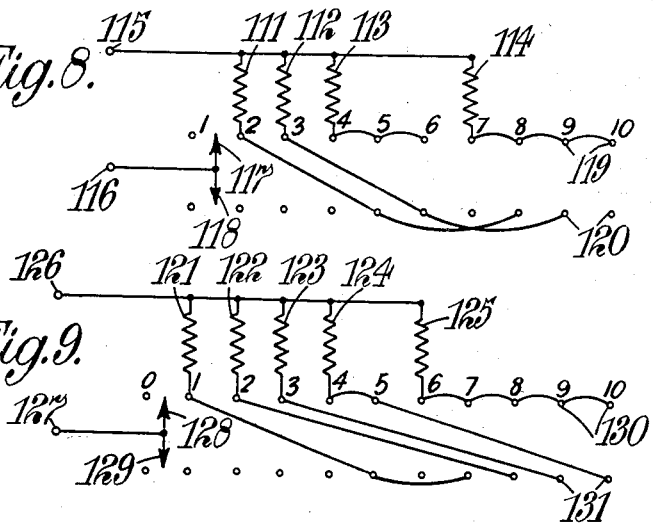
INVENTORS
Edmund R. Wigan
Charles G. Mayo
By Watson, Cole, Grindle & Watson
ATTORNEYS

United States Patent Office 2,854,643
Patented Sept. 30, 1958

2,854,643

ATTENUATORS

Edmund Ramsay Wigan, Barnham, and Charles Gilbert Mayo, London, England, assignors to Muirhead & Company Limited, Elmers End, Kent, England, a British company Application August 13, 1954, Serial No. 449,599

Claims priority, application Great Britain August 13, 1953

1 Claim. (Cl. 333—81)

This invention relates to adjustable attenuators and to electrical measuring instruments employing such attenuators.

It is a known practice to provide measuring instruments with switchable shunt networks for the purpose of adjusting the sensitivity of the instrument and also for maintaining the input impedance constant irrespective of the sensitivity adjustment. Alternatively in some cases, an adjustable shunt has been provided with multi-range instruments such that, when the range is changed by adjusting the shunt, the impedance presented to the instrument is held constant so as to maintain the damping of the instrument constant. The present invention relates to adjustable attenuators which may be used in combination with a measuring instrument for similar purposes and it is an object of the invention to provide an adjustable attenuator which provides advantages additional to those obtainable heretofore from adjustable shunts for measuring instruments.

According to this invention an adjustable attenuator comprises a network with a pair of input terminals and a pair of output terminals, the network containing adjustable shunt and series impedances, the shunt and series impedances being mechanically linked and so proportioned that the total impedance across the input terminals remains constant when the shunt and series impedances are adjusted and wherein two or more numerically indexed selector switches are provided for controlling separate sets of impedances in the network which are arranged and proportioned so that, for any setting of the switches, the sum of the indices is equal to the numerical ratio of the input to output voltages or currents. By this arrangement the various switches may be adjusted to provide the required attenuation and then the ratio of the input to output may be read directly from the indices on the switches. This arrangement is particularly useful with an indicating instrument for indicating when the attenuator output is at some predetermined level of voltage or current, as with this arrangement, the attenuator can be adjusted to give the required output voltage or current and the magnitude of the input can then be read directly from the indices on the selector switches. The attenuator can also be used, however, with instruments for measuring the output voltage or current, the attenuator enabling the range of measurement of the instrument to be increased. Furthermore, when used with a measuring instrument, the attenuator permits the measuring instrument to be used at very nearly full scale deflection where the reading accuracy is a maximum.

It will be understood that the network will have to be terminated in a load of suitable impedance since the output to input current ratio will depend on the load.

Suitable forms of network for use in the adjustable attenuator may be modified forms of bridged-T networks. In a simple form of bridged-T network having two input terminals and two output terminals and arranged as a constant resistant attenuator, there is provided a first branch comprising a direct connection between one input terminal and one output terminal, a second branch comprising two fixed resistors each of a magnitude equal to the required impedance of the network, connecting the second input terminal to second output terminal, a third branch bridging the two fixed resistors and containing a variable resistance and a shunt branch also containing a variable resistance and connecting the junction between the fixed resistors to the direct connection between the first input terminal and the first output terminal. This network is either fed from a source of impedance equal to the required impedance of the network or is terminated in a load of this impedance. Then, if the shunt resistance is varied so that its magnitude, when multiplied by the magnitude of the resistance in the bridging circuit, is equal to the square of the required impedance of the network, then simultaneous adjustment of the two variable resistances will not alter the input impedance of the network but will vary the attenuation between the input and output terminals. The ratio, however, of the input to the output current will depend on the load and, in general, this network would be terminated in a load of impedance equal to that of the network. Various modifications of this form of network are possible and in particular the connection between the first input terminal and the first output terminal may be made similar to that between the second input terminal and the second output terminal and provided with a variable bridging resistance.

In applying the principles of the bridged-T constant resistance attenuator to the present invention, there may be provided an adjustable attenuator having two input and two output terminals and comprising a network having a first branch connecting one input terminal to one output terminal, a second branch connecting the second input terminal to the second output terminal, which second branch includes in series two equal fixed impedances, a third branch also connecting the second input terminal to the second output terminal and including in series two or more adjustably stepped impedances, said network further including a number of sets of shunt impedances equal to the number of said adjustably-stepped impedances, and a selector switch for each of said sets of shunt impedances arranged for selectively connecting any one or more of the set as a shunt between said first branch and said second branch, the connection to the latter being made between the two fixed impedances, each of said switches being operatively associated with an adjustably-stepped impedance in the third branch so that, by operation of each switch, a shunt impedance and a series of impedances are varied together, the magnitudes of the impedances being arranged so that the product of the shunt and series impedance remains constant. The aforementioned second branch preferably comprises two equal fixed impedances each of a magnitude equal to the required impedance of the network. As indicated above, this network would, in general, be terminated in a load of impedance equal to that of the network. If, however, the impedance of the source is equal to the impedance of the network, then, no matter what the load impedance, the attenuation would be varied without altering the network impedance although the actual input to output ratios would depend on the magnitude of the load impedance.

In an alternative arrangement, one of the fixed resistors of the second branch may be made infinite. In this case, if the infinite impedance is at the load end of the network, then the network must be terminated in a load of impedance equal to the required impedance of the network in order to keep the network input impedance constant as the attenuation is varied. Conversely if the other fixed impedance is infinite, the source impedance must be of the required value.

In its simplest form the aforementioned first branch comprises a direct connection of negligible impedance between said one input terminal and said one output terminal. In this case, the adjustable shunt and series impedances are so proportioned that the product of each shunt impedance with its associated series impedance is equal to the square of the input impedance of the network. Alternatively, however, said first branch may include in series two fixed equal impedances and there may be provided a fourth branch connecting said one input terminal to said one output terminal and including in series a number of adjustably-stepped impedances, which are similar to and associated respectively with the adjustably-stepped impedances in the third branch and arranged so that the impedance in the third and fourth branches are varied together by said switch means, the magnitudes of the impedances being such that the separate products of each shunt impedance with each of its associated series impedances in the third and fourth branches remains constant. In this case the fixed impedances are all preferably made equal to the required input impedance of the network and the adjustable shunt and series impedances are so proportioned that the product of each shunt impedance with the sum of its associated series impedances is equal to the square of the input impedance of the network.

In general a purely resistive attenuator will be preferred and in this case all the impedances would be made resistive non-reactive impedances.

Preferably, for convenience of reading and calculation, the selector switches are arranged and the impedances proportioned to provide two or more decade ranges of input to output ratio.

It is most generally convenient that the aforementioned series impedance or the aforementioned adjustably-stepped impedances comprise a plurality of adjustably-stepped impedance units divided into steps of equal magnitude, the total impedance of each unit after the first being equal to the impedance of one step of the preceding unit.

The invention also includes within its scope an adjustable attenuator comprising a network with a pair of input terminals and a pair of output terminals and including a first branch connecting one input terminal to one output terminal, a second branch connecting the second input terminal to the second output terminal, which second branch contains two fixed resistances, a third branch containing a plurality of adjustably-stepped resistances connected together in series between said second input terminal and said second output terminal, a plurality of sets of shunt resistances the number of sets being equal to the number of said adjustably-stepped resistances, a separate selector switch for each set of shunt resistances which switches are arranged to connect a shunt resistance from each set in parallel between said first branch and said second branch, said switches also each being associated with one of the adjustably-stepped resistances, the switches being arranged and the rseistances so proportioned that operation of each switch maintains the product of the magnitude of the shunt resistance controlled by the switch and the magnitude of the associated adjustably-stepped resistance constant. As previously indicated said adjustably-stepped resistances preferably comprise decade units divided into equal steps and, in this arrangement, the third branch may also contain in series a continuously adjustable resistance of maximum magnitude equal to one step of the decade unit of lowest resistance and there may be provided an adjustable shunt resistance in parallel with the other selected shunt resistances, the operation of which adjustable shunt resistance is mechanically linked to said continuously adjustable resistance, which adjustable shunt resistance comprises one or more steps of infinite resistance together with a further range of adjustment formed by a continuously adjustable resistance. It will be appreciated that the shunt resistances associated with the lowest values of series resistance must be very high in order to maintain the magnitude of the product of the shunt and series resistances constant. The shunt resistance associated with the low resistance step of the series resistance will be very high and, as will be explained in further detail later, it is generally adequate within the required limits of accuracy to make the resistance infinite for the lowest index values. In such an arrangement, the shunt resistance (apart from the lowest index values) may comprise a continuously adjustable resistance which would have a maximum value within practical limits. It is generally found also that sufficient accuracy can be obtained even if both the continuously adjustable resistances are linearly variable although it would be appreciated that if the series resistance is linearly variable the shunt resistance should ideally follow a reciprocal function.

The sets of shunt impedances need not necessariy contain an individual impedance for each switch position since some of the required values of impedance can be formed by combining two or more impedance units which are individually associated with other switch positions. Similarly it is not necessary to provide a separate impedance unit for each step of the adjustably stepped impedance since some of the steps may be provided by combining impedance units used for other steps.

As indicated above the form of attenuator described finds particular application for use in measuring instruments. By providing a large number of range settings, preferably with decade calibrated switches, the attenuator may readily be used with an indicator for indicating one particular value of voltage or current. Thus according to a further feature of the invention, a measuring instrument comprises the combination of an adjustable attenuator as described above with an indicator for indicating a predetermined value of voltage or current. An amplifier of known gain may be provided for feeding the attenuator and an amplifier of known gain may also be provided between the output of the attenuator and the input of the indicator. Such an arrangement forms, in effect, a precision valve voltmeter.

For measuring alternating currents or voltages, the attenuator described above may very conveniently be used with the indicating instrument described in co-pending application No. 449,600, filed August 13, 1954.

In addition to its use with an indicator for indicating one particular value of voltage or current, the attenuator also finds application for increasing the range of measurement of other types of measuring instruments. It is particularly of value with sensitive galvanometers since, with such instruments, it is important to keep the damping constant and hence the resistance presented to the galvanometer must remain constant. The form of attenuator described above not only has constant input impedance but also presents constant impedance to the output terminals and hence can be used for increasing the range of the galvanometer without affecting the damping of the instrument.

In the following description, reference will be made to the accompanying drawings in which:

Figure 1 is a diagram of a known form of bridged-T attenuator;

Figure 2 is a diagram of an alternative known form of attenuator network;

Figure 3 is a diagram of one form of attenuator in accordance with the present invention;

Figure 4 is an explanatory diagram;

Figure 5 is a block diagram of a measuring instrument embodying an adjustable attenuator;

Figures 6 and 7 illustrate how a number of resistance units may be used together as an adjustable series impedance for the attenuator of Figure 3, and Figures 8 and 9 are diagrams illustrating how a number of resistance units may be combined together as an adjustable shunt impedance in the attenuator of Figure 3.

Figure 1 illustrates a bridged-T type of attenuator having two input terminals 10, 11 and two output terminals 12, 13. Between the terminals 11 and 13 there is provided a direct connection 14 forming a first branch of the network. Between the terminals 10 and 12 there are connected two resistances 15, 16 in series each having a resistance $R_0$ where $R_0$ is to be the required input impedance of the attenuator which, it is assumed, is to be connected to a load also of resistance $R_0$. Connected in shunt across the two resistors 15, 16 is a variable resistor 17 of impedance resistance $R_a$. Between the junction of the resistors 15 and 16 and the conductor 14 there is connected a shunt circuit comprising a variable resistor 18 of resistance $R_b$. If the resistors 17 and 18 are varied simultaneously in such a manner that a product of their magnitudes $R_a$ and $R_b$ is equal to the square of $R_0$, then the input impedance of the attenuator and the impedance presented to the load both remain constant and equal to $R_0$. The voltage loss ratio L through the network is equal to $1+N$ where $$N = \frac{R_a}{R_0} = \frac{R_0}{R_b}$$

If a measuring instrument is used as the load, the network becomes, in effect, a universal shunt of "range factor" L.

It may readily be shown that the input impedance looking into the terminals 10, 11 is always $R_0$ and also that the impedance looking back into the network from the load at terminals 12, 13 is also always $R_0$ if the input is suitably matched.

In the special case where the source is of impedance $R_0$, then the input impedance of the network of Figure 1 will remain constant as the attenuation is varied no matter what the load impedance is. The actual ratios of input to output current will depend, however, on the magnitude of the load impedance.

Figure 2 illustrates a modified form of bridged-T network having input terminals 10, 11 and output terminals 12, 13 and also variable resistors 17, 18 of magnitudes $R_a$ and $R_b$ respectively as in Figure 1. Instead, however, of having series fixed resistors 15, 16, there is provided in the arrangement of Figure 2 a single fixed resistor 20 of magnitude $R_0$ connected in the shunt circuit in series with resistor 18. In effect, the network of Figure 2 is the same as that of Figure 1 with the resistance 16 made infinite. With this arrangement also, it may be shown that provided $R_a R_b = R_0^2$, then the input impedance remains $R_0$ although the output impedance is not constant in this case.

The attenuator shown in Figure 3 is based on the form of bridged-T network shown in Figure 1. In Figure 3 there are provided input terminals 21, 22 and output terminals 23, 24. A direct connection 25 is made between the terminals 22 and 24 and forms the first branch of the network. Between the terminals 21 and 23 there are connected in series two resistors 26, 27 each having a magnitude equal to the required input and output impedance of the attenuator, which, for simplicity in the following description, will be assumed to be 1,000 ohms. Also connected between the terminals 21 and 23 are a number of adjustable resistors 28, 29, 30, 31, which together correspond to the resistance $R_a$ of Figure 1.

The resistance 28 is adjustable in steps and comprises nine resistance elements each of 1,000 ohms connected in series. The position of an adjustable tap 32, which determines the number of resistance elements in circuit, is controlled by means of a control knob (not shown) having a dial marked with indices 1–10 (corresponding to the tapping-point markings shown in Figure 3).

The tap 32 is connected to one end of the resistance 29 which is also an adjustably-stepped resistance having ten resistance elements each of 100 ohms. The control knob for controlling a tap 33 on the resistance 29 thus has eleven positions corresponding to the tapping points marked 0–10 in Figure 3 and is adjusted by means of a control knob provided with indices correspondingly marked from 0–10. The tap 33 is connected to one end of the resistance 30 which likewise has ten resistance elements which, in this case, are each of 10 ohms resistance. An adjustable tap 34 may be set on any of the tapping points marked 0–10 of resistance 30 and is adjusted by means of a control knob provided with corresponding indices. The tap 34 is connected to one end of a continuously variable resistance 31 which is linearly variable by movement of an adjustable tap 35 which is connected to the terminal 32. The total impedance of the resistance 31 is 10 ohms.

Between the junction of the resistors 26 and 27 and the connector 25 there are provided a number of sets of adjustable shunt impedances. The first set 40 is associated with the resistance 28 and the magnitude of the shunt impedance introduced into the circuit is controlled by means of an adjustable tap 41 which is operated by the same control knob as operates the tap 32 on resistance 28. In the first position corresponding to zero impedance on resistance 28 there is an infinite shunt impedance introduced into the network. In each of the other positions of the tap 41 there is introduced a resistive impedance, the magnitude of which is such that the product of the shunt resistance and the series resistance 28 provided by the corresponding position of the tap 32 is equal to $1,000^2$. Thus, the resistance 42 in the second position of tap 41 would have an impedance of 1,000 ohms, the resistance 43 in the third position would have a resistance of 500 ohms and so on to the impedance 44 in the tenth position which would be 1000/9 ohms.

A similar set of shunt impedances 45 are associated with the resistance 29. In this case, a tap 46 (which is controlled by the same control knob as tap 33) can be adjusted to insert a shunt impedance of infinity in the position corresponding to zero on the indices of the control knob. The shunt impedances are arranged so that the product of the shunt resistance introduced by the tap 46 and the series resistance introduced by the tap 33 is equal to $1,000^2$ and the shunt resistors are proportioned accordingly. Thus the tap 46 inserts a shunt resistance 47 of 10,000 ohms in the position marked 1 of the control knob. In the postion marked 2, a shunt resistance 48 of 5,000 ohms would be inserted and so on until, in the position marked 10, the shunt resistance would be 1,000 ohms.

A similar set of shunt impedances 50 are provided in association with the series resistance 30, an adjustable tap 51 being controlled by the same control knob as controls the tap 34. The shunt resistance for a zero position will be infinity. The resistances for positions 1–10 are arranged so that the product of their resistance and that introduced by the tap 34 in a corresponding position on resistance 30 is equal to $1,000^2$ as before and thus, for example, the shunt resistance 52 for the position marked 1 would be 100,000 ohms.

The resistance 31 is continuously variable. It would not be practicable to introduce a continuously variable shunt resistance in this case since the shunt resistance would have to be adjustable between 100,000 ohms and infinity following a reciprocal law. For practical purposes it is sufficiently accurate to introduce infinite resistance in the first and second positions of an adjustable tap 55 which controls the shunt impedance and which is operated by the same control knob as controls the tap 35 on resistance 31. Hence there will be an infinite shunt impedance until the tap 35 has been moved one fifth of the way from resistance 31 from the zero end. For the remaining part of the shunt impedance, there is provided a linearly variable resistance 56 of 200,000 ohms connected in series with a fixed resistance 57 of 100,000 ohms so that when the tap 55 has been moved to the lower end of the resistance 56 in the diagram, that is corresponding to maximum impedance of the resistance 31, then there is 100,000 ohms in the shunt impedance. The shunt impedance is thus 300,000 ohms when the series impedance of resistance 31 is two ohms and the shunt impedance decreases linearly to 100,000 ohms as the series impedance increases to ten ohms.

The use of two continuously variable resistors 31 and 56 may be more clearly understood by reference to Figure 4 which is a graph having the index positions of taps 35 and 55 as abscissa. The straight line 60 shows, on the right hand ordinate scale, the magnitude of the series resistance 31. The dotted curve 61 shows the desired value of total shunt resistance such that the product of the shunt and series impedances should be $1000^2$. The straight line 62 shows the value of shunt resistance obtained using a variable resistor 56 of 200,000 ohms together with a fixed resistor 57 of 100,000 ohms. The chain-dotted line 63 represents the shunt impedance obtained with an alternative arrangement in which the resistor 56 is 350,000 ohms and the resistor 57 is 50,000 ohm.

It may be shown that such an arrangement introduces almost negligible error compared with the use of correctly proported shunt resistances. The effect of the infinite resistance in the first two positions is to alter the input impedance of the network and the effect is dependent upon the value of the impedance from which the network draws its input. In a typical application, as described later, this is a cathode follower of an amplifier stage and in such a case the impedance may be as low as 10 ohms. If the ratio of the source impedance to the characteristic impedance $R_0$ of the network is K it can be shown that the error is $$e = \frac{a\left(a + \frac{2KR_0}{1+K}\right)}{R_0(a+2R_0)}$$

where $a$ is the magnitude of the resistance 31.

If we assume that the steps represented by taps 32, 41 are unity, then the index marking for taps 35, 55 are steps of 0.001. For these to be reliable to one tenth of a division, the quantity $e$ above must not exceed 0.0001. For an attenuator setting of 1.002, which is the setting known to yield the largest error, the value of $$\frac{a}{R_0}$$

is only 0.002. Thus $a$ is negligible in comparison with $R_0$ whilst $KR_0$ is small and thus it may be shown that, for this required accuracy, K can reach a value of one quarter. With a characteristic impedance of 1,000 ohms, the source resistance must therefore not exceed 250 ohms, if the 0.001 dial is to be relied upon to one tenth of a division.

If it is not possible to use a low impedance source, the final shunt and series resistances may be made in decade steps like the others. If the attenuator is used, as described below, with a null indicator, interpolation between steps may be made by reading the "off-balance" indications on the indicator.

Another method of obtaining the required accuracy if the attenuator is to be used with a source not of sufficiently low impedance would be to use a shunt resistor arranged such that movement of the tap 55 gives a non-linear variation of resistance.

It may be noted that the precision of the resistors 30, 50 may be substantially less than those of the earlier stages of the attenuator and in a typical case may be of the order of 1% as against 0.1% for the earlier stages. The precision of the last stage may be still less, for example, of the order of 10%, whilst still maintaining the required overall accuracy of the attenuator.

To revert to consideration of the attenuator as a whole, if the first taps 32, 41 are set to index mark 3, the second taps 33, 46 are set to index mark 2 and remaining taps are set to zero, then the series impedance is 2,200 ohms and the shunt impedance, which it will be noted are in parallel, will be 1000 × 0.5 in parallel with 1000 × 5 making an effective shunt impedance of 1000/2.2 ohms. Thus the product of the shunt and series impedances is $1000^2$. The value of N, as defined above, is 2.2 and the loss ratio L is 3.2 which is equal to the sum of the indices of the tap settings.

In Figures 3 and 4, there has been described a form of adjustable attenuator based on the principles of the bridged-T network of Figure 1. It will be readily apparent that a similar form of attenuator may be constructed based on the principles of the network shown in Figure 2.

Figure 5 illustrates one application of the attenuator for the measurement of alternating currents or voltages. The input signal to be measured is applied to two input terminals 70, 71 which are connected to a "range selector" comprising a potential divider 72 divided into five steps each of which gives a voltage ratio of 1/10 of the preceding step thereby giving a range selection of 100,000 to 1. These steps can be selected by means of an adjustable tap 73 and the output of the range selector is fed to an amplifier 74 which has a known gain of, for example, 40 decibels. The output from the amplifier 74 is fed to the attenuator which is indicated diagrammatically by the rectangle 75 and the output from the attenuator is fed to a further amplifier 76 which also has a known gain of, for example 40 decibels. Both amplifiers have negative feed back and are arranged so as to have an accurately known and constant gain.

Provision is made for checking the gain of each of the amplifiers. If the amplifiers have 40 db of feedback, their gain might change, as the valves age, by say 0.1%. The replacement of an aged valve might cause the same order of gain change. Since the overall accuracy of the measuring instrument might be required to be within 0.1%, provision for checking the gain of the amplifiers is necessary and, for this purpose, there may be provided a simple bridge circuit for measuring the loss in the feed-back path. Alternatively, means may be provided for generating a precisely known waveform (e. g. pseudo square wave) of known amplitude using a direct voltage source set up by reference to a standard cell. The R. M. S. value of this signal will thus be exactly known and the signal can be used to check the overall performance of the measuring instrument. Small trimmer resistances are provided in the feed back paths of the amplifiers to allow small gain changes to be made to correct for any errors discovered by such tests.

For reasons previously described, the amplifier 74 preferably has a low output impedance and for this reason it includes a final cathode follower stage feeding the attenuator 75. The output from the amplifier 76 is fed to a lamp bridge 77 for indicating when the amplifier alternating voltage output is at a predetermined value. This form of lamp bridge is described and claimed in co-pending application No. 449,600, filed August 13, 1954. In the particular example shown in Figure 5 there is shown a pair of lamps 78 connected in series to form one arm of a bridge circuit. The opposite arm comprises a variable resistor 79 and the other two arms 80 and 81 each comprise a fixed resistor, each of the resistors 80 and 81 being of a resistance equal to the required impedance into which the amplifier 76 is to feed. From the amplifier 76 both the alternating voltage output and a direct voltage are applied to one diagonal of the bridge through the network comprising two condensers 82, 83, a variable resistor 84 and an indicating meter 85. An indicating meter 86 is connected across the second diagonal. The lamps 78 constitute a non-linear resistance the resistance of which varies with the temperature of the lamps and hence with the amount of current through the bridge. For this reason if the bridge is balanced by adjustment of the resistor 79, it will only remain in balance provided the current through the bridge or the voltage across it remains constant. The direct voltage is applied to the bridge to provide a source of current for the meter 85. The direct current through the lamps is made small compared with the alternating current. Hence a coarse adjustment of the direct current can be used to effect a very fine control of the point at which the bridge is balanced to alternating currents. The amount of direct current is indicated by the meter 85 and can be adjusted by the variable resistor 84. For any given direct current, the bridge will only balance at one particular value of alternating current. By using both the alternating current and a direct current feed to the bridge in this way, the meter 86 will indicate the direction of unbalance. Conveniently the amplifier 76 is provided with a cathode-follower output stage so that both a direct voltage and an alternating voltage output may be obtained together from across a cathode load resistor.

The measuring apparatus shown in Figure 5 is used by adjusting the range selector 72 to give a required range; this range selector may for example be adapted to provide ranges from 1 millivolt to 100 volts. The attenuator 75 is then adjusted until the bridge is balanced and the input voltage is then measured by reading the indices on the attenuator 75 adding them together and using the sum as a multiplication factor for the range shown by the position of the tap 73 on the range selector 72.

It will be noticed that a measuring instrument of this kind using a non-linear bridge such as has just been described will measure the true heating value of an alternating signal fed to it, that is to say the R. M. S. of the amplitudes of the components of a complex wave. Therefore this measuring instrument does not suffer from errors due to the form factor of the alternating signal.

In the arrangement described above with reference to Figure 3, it has been assumed that the series resistances 28, 29 and 30 each consist of a number of resistance elements connected in series and provided with an adjustable tap. It is, however, possible to combine resistance units so that it is not necessary to have as many units of resistance as there are steps of adjustment. Figure 6 shows one arrangement for the adjustably-stepped resistor 28. Instead of having a single tap 32 and a fixed connector to the terminal 21, the resistance unit 28 is provided with two ganged adjustable taps 90, 91 connected to terminals 92, 93 respectively. The taps 90 and 91 are ganged together so as to be movable simultaneously over two sets of tapping points 94, 95 respectively. Four resistances 96, 97, 98 and 99 are provided, these having values respectively equal to one unit, two units, three units and six units of the required steps for the resistance 28 of Figure 3. In the example previously described these steps are 1,000 ohms each. By connecting these fixed resistors to the tapping points indicated by the indices 2, 3, 4 and 7 respectively and by interconnecting the other tapping points in the manner shown, it will be seen that movement of the ganged adjustable taps 90, 91 along the tapping points will provide, between the terminals 92 and 93, resistances which vary in unit steps from zero to nine units as the taps are moved from the positions indicated by the indices 1–10 respectively.

A similar arrangement may be used for the adjustably-stepped resistances 29 and 30 of Figure 3. In this case it is necessary to have eleven steps and a suitable arrangement is illustrated in Figure 7. Five fixed resistors 101—105 are provided having magnitudes of 1, 2, 3, 4 and 6 units respectively. Two ganged adjustable taps 106, 107 are provided as before and by moving these along the fixed tapping points corresponding to the indices 0–10, there is provided, between terminals 108, 109, resistances which vary in unit steps between zero and 10 units.

Likewise for the shunt impedance 40 it is not necessary to provide nine separate fixed resistors and, as shown in Figure 8, only four fixed resistors 111–114 are necessary. The resistor 111 has a value of one unit which, in the example previously given would be 1,000 ohms. The resistor 112 has a resistance of half a unit, that is to say 500 ohms. The resistor 113 has a value of one third of a unit, that is 333.33 ohms and the resistor 114 has a value of one sixth of a unit, that is 166.67 ohms. All of the resistors 111–114 at one end are connected together and to a terminal 115. The other terminal 116 of the shunt resistance is connected to a pair of ganged adjustable taps 117, 118 which can be moved together along a series of tapping points 119, 120 respectively, which tapping points are connected together as shown in Figure 8. It will be seen that by this arrangement the nine step values of shunt resistance required for the unit 40 of Figure 3 are provided between the terminals 115, 116 together with the infinite resistance in the position corresponding to the index 1 on the dial.

A similar form of shunt impedance may be used for the impedances 45 and 50 of Figure 3. In this case 11 steps are required as shown in Figure 9 and for this purpose it is necessary to use five fixed resistances 121–125 of magnitudes respectively equal to one unit, half a unit, one third of a unit, one fourth of a unit and one sixth of a unit. All these resistors 121–125 are connected together at one end to one terminal 126. The other terminal 127 of this shunt impedance unit is connected to two adjustable taps 128, 129 which are ganged together so as to be movable simultaneously along two steps of tapping points 130, 131 respectively. By connecting the various tapping points together as shown in Figure 9, the required 10 steps of the shunt impedance are provided together with the infinite impedance in the zero index position.

It will readily be apparent that other arrangements for combining units of resistance may be used in order to reduce the number of fixed resistors employed in the attenuator.

We claim:

An adjustable attenuator comprising a four terminal constant impedance network of the bridged-T type having a first branch connecting one input terminal to one output terminal, a second branch connecting the second input terminal to the second output terminal and containing in series two equal fixed impedances, a third branch also connecting the second input terminal to the second output terminal and containing a variable series impedance, and a variable shunt impedance connected between said first branch and the junction of the fixed impedance in said second branch, in which the attenuation ratio may be varied without changing the input impedance of the network provided that the dimensions of the variable series and shunt impedances are always such that $R_a R_b = R_0^2$, where $R_a$ is the series impedance, $R_b$ is the shunt impedance and $R_0$ is the desired input impedance in the network, the variable series impedance consisting of a plurality of sets of variable impedances and the variable shunt impedance consisting of a like number of sets of variable impedances, and the attenuator including a plurality of pairs of switches equal to the number of sets of series and shunt impedances, one switch of each pair controlling one set of series impedances and the other switch of each pair controlling a related set of shunt impedances, means mechanically linking the two switches of each pair so that a series and a shunt impedance are varied together, and a numerically indexed scale for each pair of switches, the series and shunt impedances being so dimensioned that for all setting of the switches the product of the series and shunt impedances in the circuit is constant, whereby the sum of the scale indices is equal to the numerical ratio of attenuation between the input and output terminals.

(References on following page)

References Cited in the file of this patent

UNITED STATES PATENTS

| | | |
|---|---|---|
| 2,153,743 | Darlington | Apr. 11, 1939 |
| 2,284,423 | Hansell | May 26, 1942 |
| 2,694,184 | Rounds | Nov. 9, 1954 |
| 2,718,622 | Harkless | Sept. 20, 1955 |
| 2,743,324 | Gregory et al. | Apr. 24, 1956 |
| 2,781,417 | Bower | Feb. 12, 1957 |

FOREIGN PATENTS

| | | |
|---|---|---|
| 878,379 | Germany | June 1, 1953 |